(12) United States Patent
Huang

(10) Patent No.: US 8,375,525 B1
(45) Date of Patent: Feb. 19, 2013

(54) STRAP-TENSIONING APPARATUS

(76) Inventor: Han-Ching Huang, Taichung (TW)

( * ) Notice: Subject to any disclaimer, the term of this patent is extended or adjusted under 35 U.S.C. 154(b) by 0 days.

(21) Appl. No.: 13/335,848

(22) Filed: Dec. 22, 2011

(51) Int. Cl.
*B60P 7/06* (2006.01)
*B60P 7/08* (2006.01)
*B25B 25/00* (2006.01)

(52) U.S. Cl. .............. 24/68 CD; 24/909; 242/385.4; 254/218; 410/100

(58) Field of Classification Search ............ 24/68 CD, 24/909, 68 CT, 68 ST; 254/217, 218, 222, 254/223, 237, 238, 239, 375; 242/388.2, 242/388.6, 388.1, 396.6, 385.4; 410/100, 410/103, 12
See application file for complete search history.

(56) References Cited

U.S. PATENT DOCUMENTS

| | | | | |
|---|---|---|---|---|
| 4,622,721 A * | 11/1986 | Smetz et al. | ........... | 24/68 CD |
| 5,611,520 A * | 3/1997 | Soderstrom | ........... | 254/218 |
| 6,102,371 A * | 8/2000 | Wyers | ........... | 254/218 |
| 6,609,275 B1 * | 8/2003 | Lin | ........... | 24/68 CD |
| 7,100,902 B1 * | 9/2006 | Lu | ........... | 254/218 |
| 7,296,326 B2 * | 11/2007 | Madachy et al. | ........... | 24/68 CD |
| 7,861,382 B1 * | 1/2011 | Madachy et al. | ........... | 24/68 CD |
| 8,037,580 B2 * | 10/2011 | Huang | ........... | 24/68 CD |
| 2003/0145434 A1 * | 8/2003 | Lin | ........... | 24/68 CD |
| 2004/0084558 A1 * | 5/2004 | Huang | ........... | 242/385.4 |
| 2010/0205790 A1 * | 8/2010 | Chen | ........... | 24/68 CD |
| 2010/0293765 A1 * | 11/2010 | Huang | ........... | 24/68 CD |
| 2010/0293766 A1 * | 11/2010 | Huang | ........... | 24/68 CD |
| 2010/0322737 A1 * | 12/2010 | Huang | ........... | 410/100 |
| 2011/0061213 A1 * | 3/2011 | Chang | ........... | 24/68 CD |

* cited by examiner

*Primary Examiner* — Robert J Sandy
*Assistant Examiner* — Rowland D Do

(57) ABSTRACT

A strap-tensioning apparatus includes a frame, a handle, a reel, two ratcheted wheels, two detents and a strap-damping unit. The handle is connected to the frame. The reel is supported on the frame. The ratcheted wheels are secured to the reel. The strap is inserted through a slit of the reel. The first detent is supported on the handle for engagement with the ratcheted wheels to rotate the reel when the handle is pivoted in a direction. The second detent is supported on the frame for engagement with the ratcheted wheels to stop the reel when the handle is pivoted in an opposite direction. The strap-damping unit includes a crossbar, a pressing element and a spring. The crossbar is supported on the frame. The pressing element is biased toward the crossbar by a spring. The strap is inserted through a gap between the pressing element and the crossbar.

7 Claims, 5 Drawing Sheets

STRAP-TENSIONING APPARATUS

BACKGROUND OF INVENTION

1. Field of Invention

The present invention relates to an apparatus for tensioning a strap for bonding cargo and, more particularly, to a strap-tensioning apparatus equipped with a strap-damping unit.

2. Related Prior Art

As disclosed in Patent Application Publication US20110233493, a fastener includes a handle 31 pivotally connected to a frame 11 by an axle 16. A section of a strap 46 is inserted through a slot 17 defined in the axle 16 so that the strap 46 can be reeled in and out as the axle 16 is rotated. Two ratcheted wheels 21 are attached to the axle 16. One ratchet of each ratcheted wheel 21 is engaged with a first detent 26 movably connected to the frame 11 while another ratchet of each ratcheted wheel 21 is engaged with a second detent 36 movably connected to the handle 31. Thus, the handle 31 can be pivoted on the frame 11 to rotate the axle 16 and reel in the strap 46.

As disclosed in Patent Application Publication US2010/0293765, corresponding Patent Application Publication DE 20 2009 007 685, and corresponding Taiwanese Patent M389001, a rod is provided between a first shaft 30 and a reeling device 50 provided on a lever 20. A strap 90 is pressed by the rod when the lever 20 is located against the body 10.

As disclosed in Patent Application Publication DE 10 201 0 002 052, a fastener 10 includes a strap-damping device 22 provided between a shaft 12 and a reeling device 13. The strap-damping device 22 includes a rod 22a, a shaft 22b separated from the rod 22a by a gap, and a clamping element 22c supported on the shaft 22b. A strap 20 can be clamped by the rod 22a and the clamping element 22c.

SUMMARY OF INVENTION

It is the primary objective of the present invention to provide a safe-to-use apparatus for tensioning a strap.

To achieve the foregoing objective, the apparatus includes a frame, a handle, an automatic reel, a manual reel, two ratcheted wheels, two detents and a strap-damping unit. The frame includes two slots defined therein. The handle is pivotally connected to the frame. The automatic reel is supported on the frame. The manual reel is supported on the frame and formed with a slit. The ratcheted wheels are connected to the manual reel so that the manual reel is rotated together with the ratcheted wheels. The strap includes an idle section wound on the automatic reel and an active section inserted through the slit of the manual reel so that the active section of the strap is wound as the manual reel is rotated. The first detent is movably supported on the handle for engagement with the ratcheted wheels to rotate the manual reel when the handle is pivoted on the frame in a direction. The second detent is movably supported on the frame for engagement with the ratcheted wheels to stop the manual reel when the handle is pivoted on the frame in an opposite direction. The strap-damping unit includes a crossbar, a pressing element and at least one spring. The crossbar is supported on the frame. The pressing element is biased toward the crossbar and formed with two sliding portions movably inserted in the slots. The active section of the strap is inserted through a gap between the pressing element and the crossbar.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
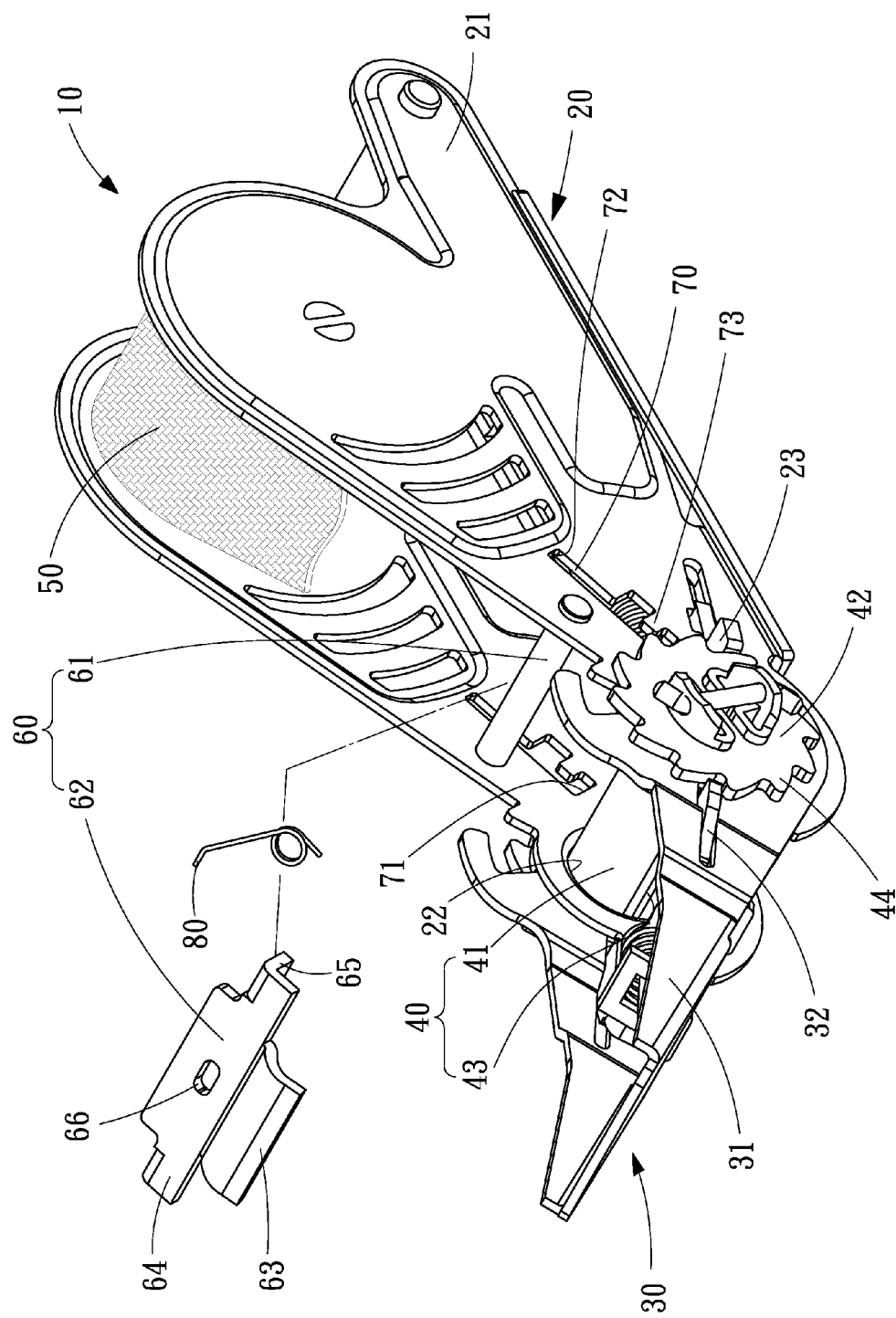
FIG. 1 is an exploded view of a strap-tensioning apparatus equipped with a strap-damping unit according to the preferred embodiment of the present invention.
Figure 2:
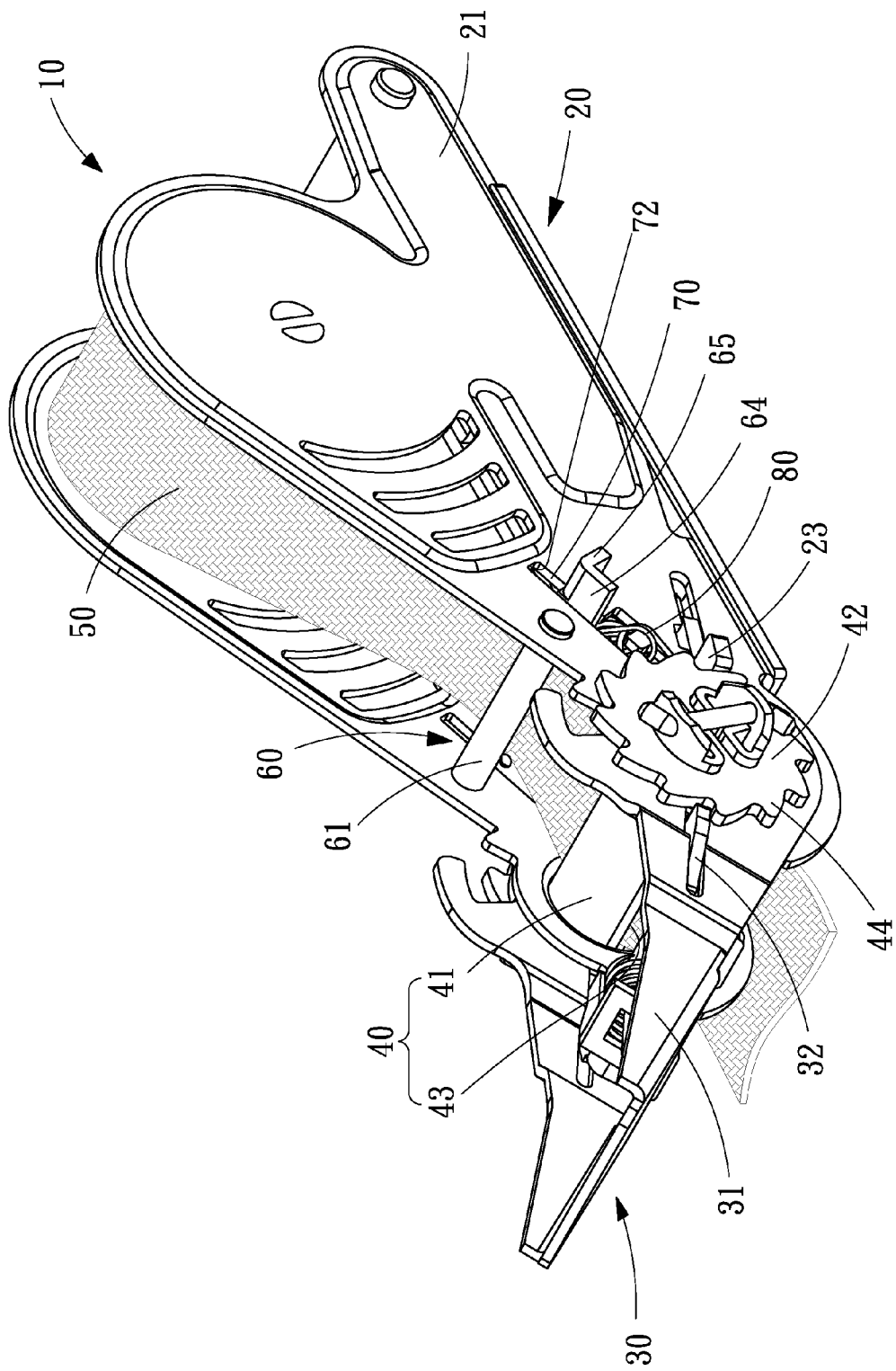
FIG. 2 is a perspective view of the strap-tensioning apparatus shown in FIG. 1.

Referring to FIGS. 1 through 4, there is shown a strap-tensioning apparatus 10 in accordance with the preferred embodiment of the present invention. The strap-tensioning apparatus 10 includes a frame 20, a handle 30, a manual reel 40, an automatic reel 52, a strap 50 and a strap-damping unit 60.

The frame 20 includes two parallel walls 21 extending from a floor. Each of the walls 21 includes a slot defined therein and a circular opening 22 defined therein near an end.

The handle 30 includes two parallel walls 31 extending from a roof. Each of the walls 31 includes a slot defined therein and a circular opening 22 defined therein corresponding to the circular opening 22 of a respective one of the walls 21.

The manual reel 40 includes two parallel crossbars 41 each including two ends each inserted through the circular opening 22 of a respective one of the walls 21 and the circular opening 22 of a respective one of the walls 31. Each of the crossbars 41 includes a crescent profile when it is viewed along a length. A slit 43 is defined between the crossbars 41.

Two ratcheted wheels 42 are attached to the manual reel 40. Each of the ratcheted wheels 42 includes ratchets 44 formed thereon. Each of the ratcheted wheels 42 further includes two crescent openings each receiving a respective end of a respective crossbar 41.

A detent 23 is a flat element with two wings each movably inserted in the slot of a respective one of the walls 21. Thus, the detent 23 is movably supported on the frame 20. The detent 23 is biased toward the ratcheted wheels 42 by a spring, thus tending to engage the wings of the detent 23 with the ratcheted wheels 42.

A detent 32 is a flat element with two wings each movably inserted in the slot of a respective one of the walls 31. Thus, the detent 32 is movably connected to the handle 30. The detent 23 is biased toward the ratcheted wheels 42 by a spring, thus tending to engage the wings of the detent 32 with the ratcheted wheels 42.

The automatic reel 52 is supported on the walls 21 of the frame 20. The structure of the automatic reel 52 will not be described in detail for not being the spirit of the present invention.

The strap 50 includes a first end connected to the automatic reel 52 and a second end connected to a hook (not shown). The strap 50 includes an idle section that is wound on the automatic reel 52 and an active section that is not wound on the automatic reel 52. It should be noted that the length of the idle section is increased as the length of the active section is reduced. The active section of the strap 50 is inserted through the slit 43.

In use, the hook is engaged with a portion of a truck for example. The idle section of the strap 50 is automatically wound by the automatic reel 52. The handle 30 is pivoted on the frame 20 in a direction so that the detent 32 engages with the ratcheted wheels 42 to rotate the manual reel 40 to wind and tension the active section of the strap 50. Then, the handle 30 is pivoted on the frame 20 in an opposite direction so that the detent 32 rattles on the ratcheted wheels 42 without rotating the manual reel 40 to reel out and loosen the active section of the strap 50. The handle 30 is pivoted to and fro on the frame 20 to tension the active section of the strap 50.

Each of the walls 21 includes a slot 70 defined therein. The slot 70 includes a first end 71 and a second end 72. Compared with the first end 71, the second end 72 is located far from the circular opening 22. The slot 70 is defined between upper and lower edges. A boss 73 is formed on the lower edge of the slot 70.

The strap-damping unit 60 includes a crossbar 61, a pressing element 62 and two torque springs 80. The crossbar 61 includes two ends each secured to a respective one of the walls 21.

The pressing element 62 includes a pressing portion 63 extending from a front edge, two sliding portions 64 each extending from a lateral edge, and two restraining portions 65 each extending from a rear edge of a respective one of the sliding portions 64 in a coplanar manner. The sliding portions 64 are inserted through the slots 70 before the restraining portions 65 are bent. Thus, the pressing element 62 is retained movable on the walls 21.

Each of the torque springs 80 includes a helical section extending to a short rectilinear section from a long rectilinear section. The helical section of each of the torque springs 80 is provided around the boss 73 of a respective one of the walls 21 while the short rectilinear section is in contact with a respective one of the walls 21 and the long rectilinear section is inserted through an aperture 66 defined in the pressing element 62.

Figure 3:
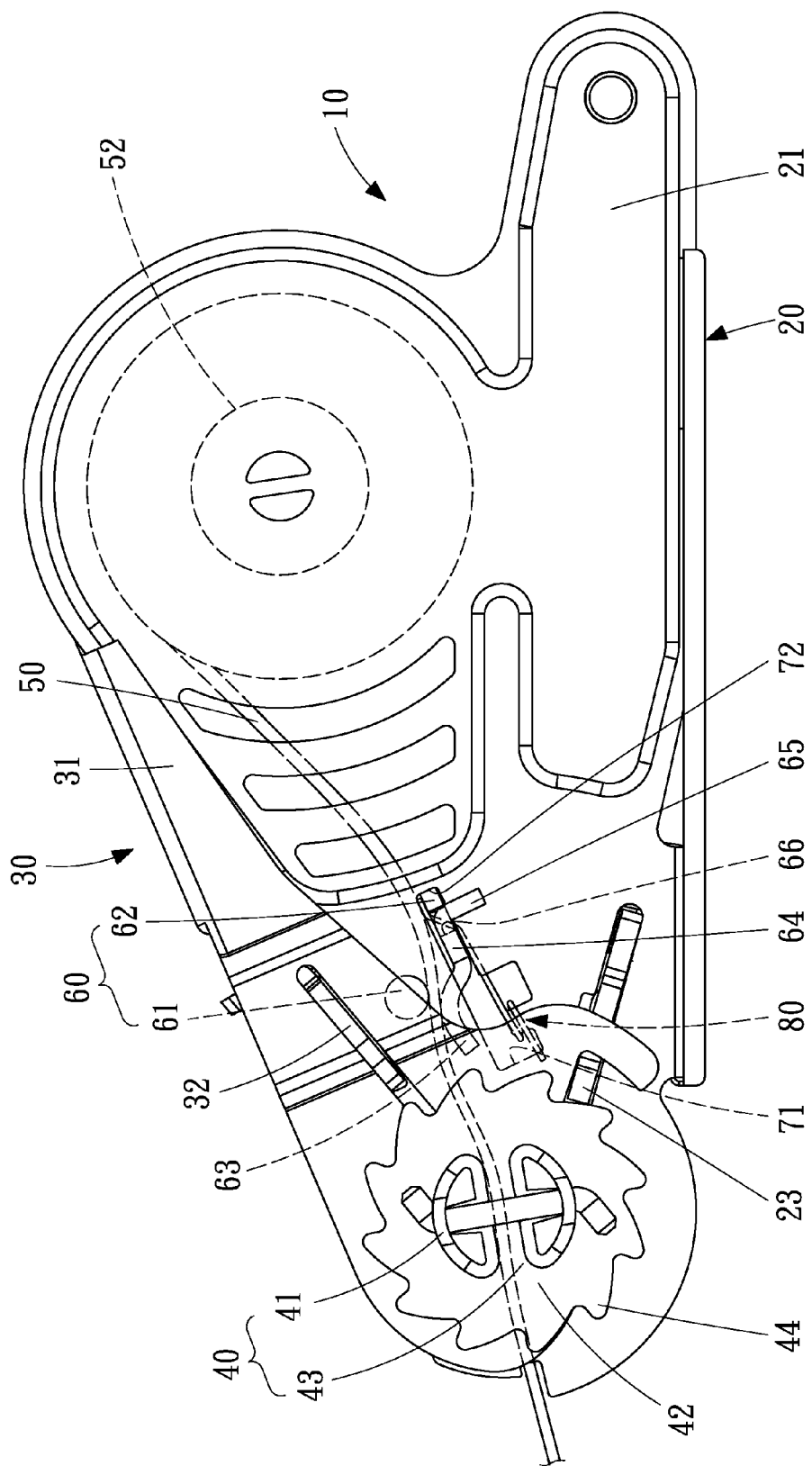
FIG. 3 is a side view of the strap-tensioning apparatus shown in FIG. 2.

Referring to FIG. 3, the strap 50 is inserted through a gap between the crossbar 61 and the pressing portion 63 of the pressing element 62 while the sliding portions 64 of the pressing element 62 are movable in and along the slots 70 between the first and second ends 71 and 72. The strap 50 is clamped by the crossbar 61 and the pressing portion 63 of the pressing element 62 while the sliding portions 64 of the pressing element 62 are biased by the torque springs 80.

The strap 50 is withdrawn into and by the automatic reel 52. The pressing portion 63 of the pressing element 62 is brought closer to the crossbar 61 by the strap 50 for friction between the pressing portion 63 of the pressing element 62 and the strap 50. Thus, the strap 50 is clamped tighter by the crossbar 61 and the pressing portion 63 of the pressing element 62.

Figure 4:
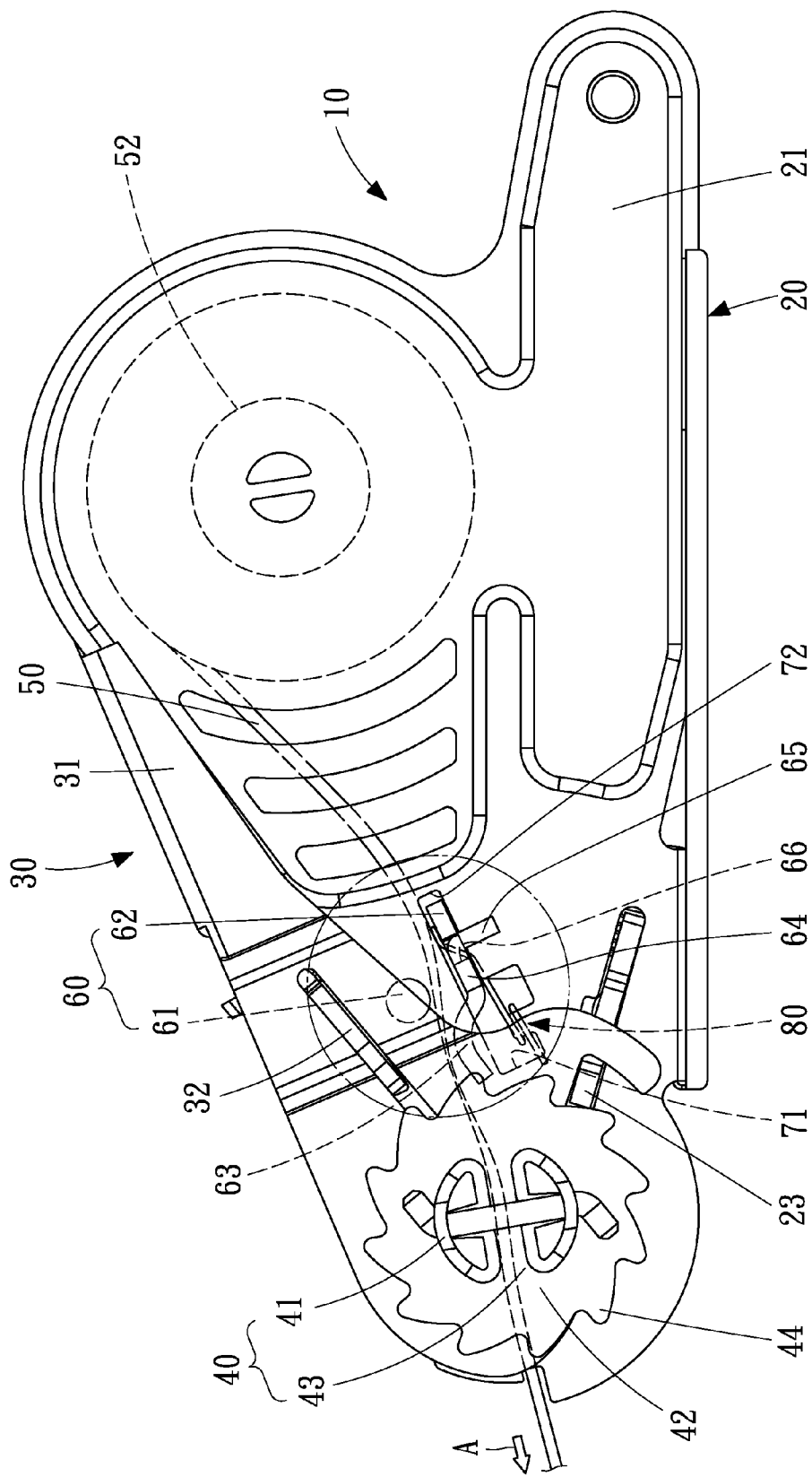
FIG. 4 is a side view of the strap-tensioning apparatus in another position than shown in FIG. 2.
Figure 5:
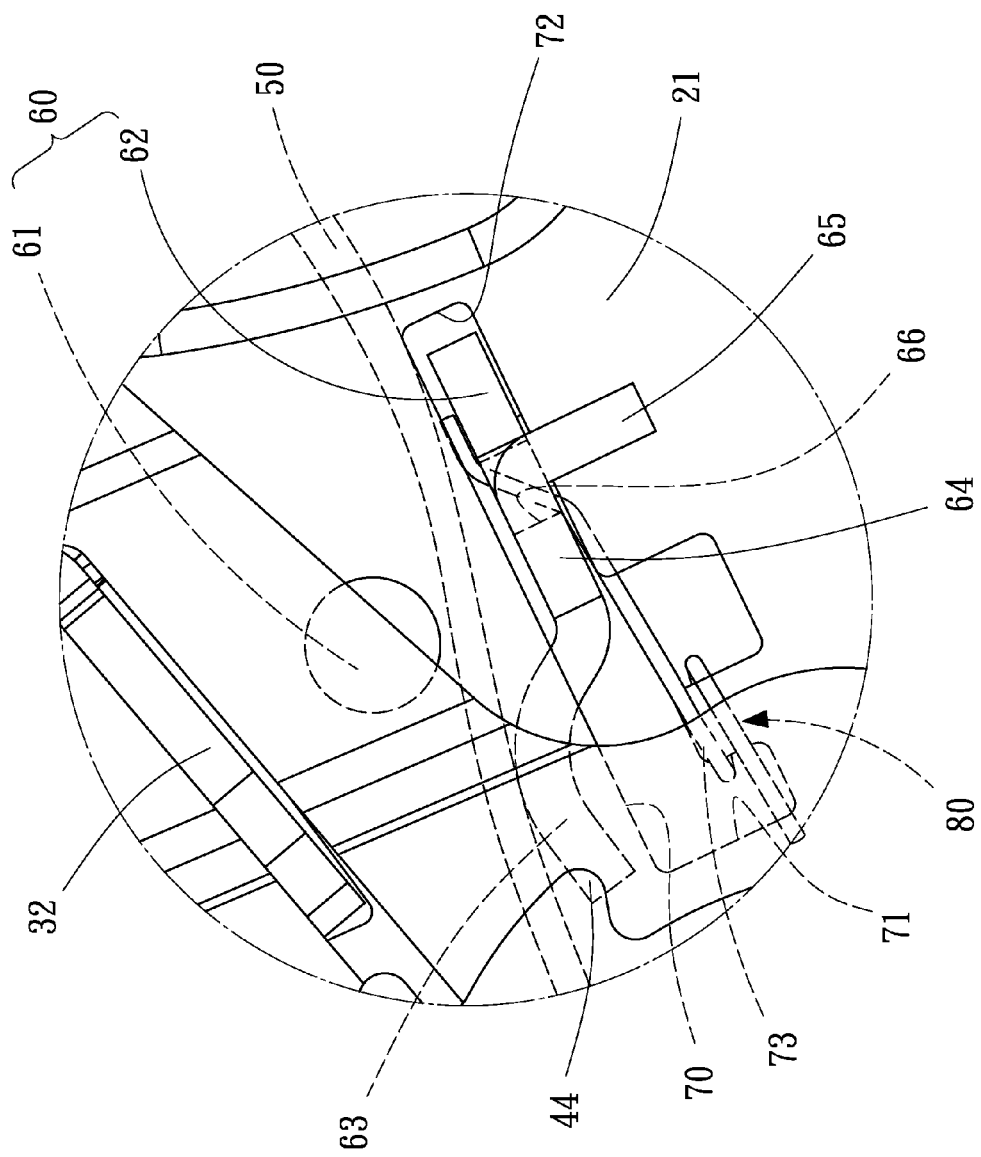
FIG. 5 is an enlarged partial view of the strap-tensioning apparatus shown in FIG. 4.

Referring to FIGS. 4 and 5, the strap 50 is unreeled from the automatic reel 52. The pressing portion 63 of the pressing element 62 is brought further from the crossbar 61 by the strap 50 for the friction between the pressing portion 63 of the pressing element 62 and the strap 50. Thus, the strap 50 is not considerably damped by the strap-damping unit 60.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A strap-tensioning apparatus including:
a frame including two slots defined therein;
a handle pivotally connected to the frame;
an automatic reel supported on the frame;
a manual reel supported on the frame and formed with a slit;
two ratcheted wheels connected to the manual reel so that the manual reel is rotated together with the ratcheted wheels;
a strap including an idle section wound on the automatic reel and an active section inserted through the slit of the manual reel so that the active section of the strap is wound as the manual reel is rotated;
a first detent movably supported on the handle for engagement with the ratcheted wheels to rotate the manual reel when the handle is pivoted on the frame in a direction;
a detent movably supported on the frame for engagement with the ratcheted wheels to stop the manual reel when the handle is pivoted on the frame in an opposite direction; and
a strap-damping unit including:
a crossbar supported on the frame; and
a pressing element biased toward the crossbar and formed with two sliding portions movably inserted in the slots, wherein the active section of the strap is inserted through a gap between the pressing element and the crossbar.

2. The strap-tensioning apparatus according to claim 1, wherein each of the slots includes a first end and a second end located further from the manual reel than the first end is, wherein the pressing element is brought closer to the crossbar as each of the sliding portions of the pressing element is moved toward the second end of a respective one of the slots.

3. The strap-tensioning apparatus according to claim 2, wherein the strap-damping unit includes two torque springs for biasing the pressing element toward the crossbar.

4. The strap-tensioning apparatus according to claim 3, wherein the frame includes two bosses each inserted in a helical section of a respective one of the torque springs.

5. The strap-tensioning apparatus according to claim 4, wherein each of the bosses is located within a respective one of the slots.

6. The strap-tensioning apparatus according to claim 1, wherein the pressing element includes two restraining portions each extending from a respective one of the sliding portions for abutment against the frame to retain the pressing element on the frame.

7. The strap-tensioning apparatus according to claim 1, wherein the pressing element includes a pressing portion extending toward the strap.

\* \* \* \* \*